United States Patent [19]
Goldberg

[11] 3,894,620
[45] July 15, 1975

[54] ARTICULATED FRICTION UNIT ASSEMBLY FOR BRAKE OR CLUTCH USE

[76] Inventor: David N. Goldberg, 415 S. Front St., Wheeling, W. Va. 26003

[22] Filed: Mar. 26, 1974

[21] Appl. No.: 454,902

[52] U.S. Cl. .......... 192/75; 192/107 T; 188/250 A; 188/330
[51] Int. Cl. ... F16d 13/18; F16d 51/22; F16d 65/08
[58] Field of Search ....... 192/75, 107 T; 188/250 A, 188/330

[56] References Cited
UNITED STATES PATENTS

| | | | |
|---|---|---|---|
| 2,708,010 | 5/1955 | Wolf | 192/107 T X |
| 2,778,470 | 1/1957 | Goldberg | 192/107 T |
| 2,910,162 | 10/1959 | Goldberg | 192/107 T |
| 2,993,577 | 7/1961 | Goldberg | 192/75 X |
| 3,001,622 | 9/1961 | Goldberg | 192/107 T X |

Primary Examiner—Allan D. Herrmann
Attorney, Agent, or Firm—John R. Swindler

[57] ABSTRACT

Shoe sections of a friction unit assembly for a brake or clutch structure are pivotally interconnected in longitudinal alignment with a lever arm fixedly connected to one section and extending past the pivotal connection to the other section. The lever arm provides an abutment stop which engages with an arc diameter limiting member on the other section to limit the maximum arc to which the shoe sections may pivotally move to relative to each other and biasing means acts between the other shoe section and lever arm to urge the shoe sections to this maximum arc relationship.

14 Claims, 8 Drawing Figures

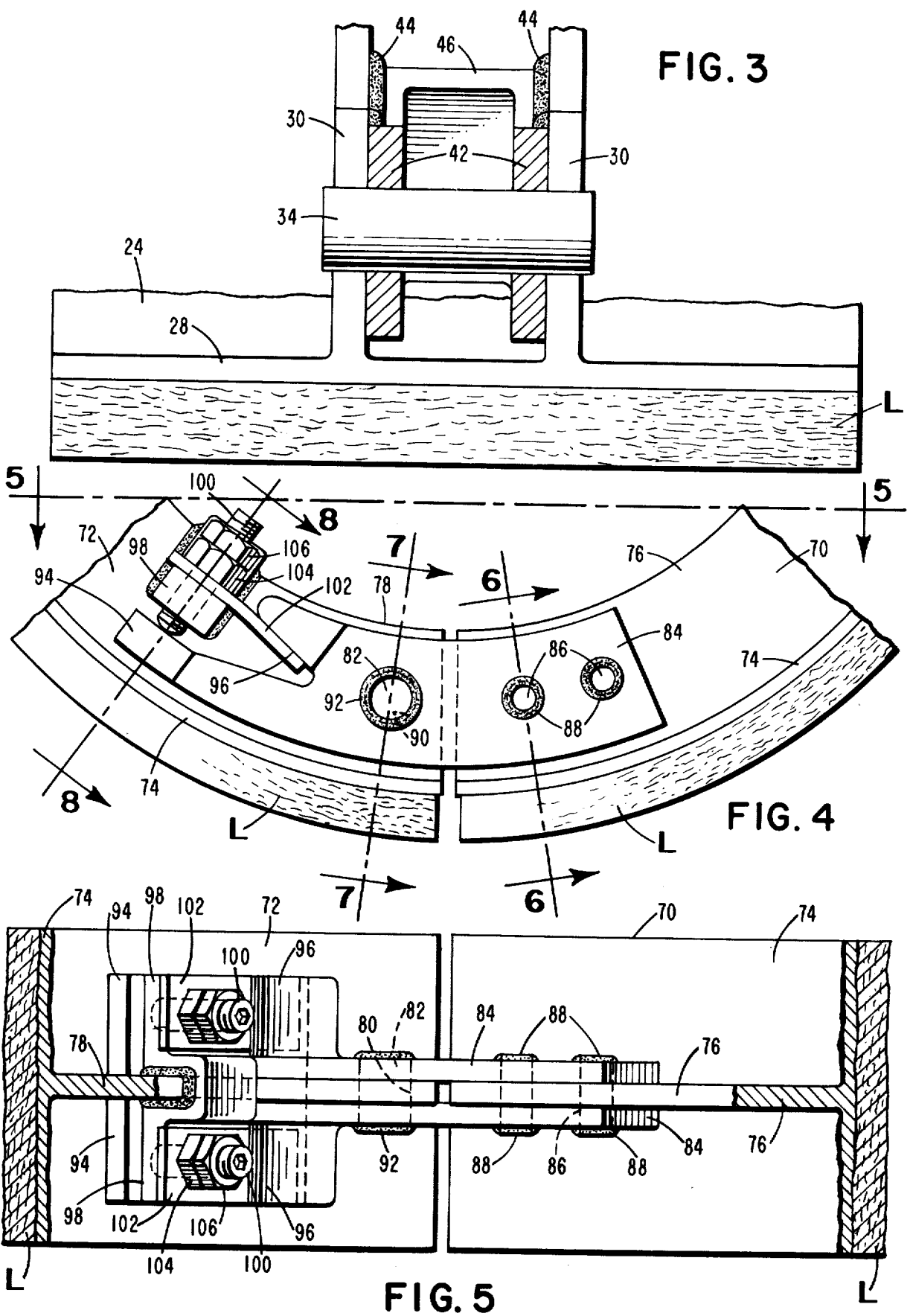

ARTICULATED FRICTION UNIT ASSEMBLY FOR BRAKE OR CLUTCH USE

BACKGROUND OF THE INVENTION

1. Field of the Invention

The invention relates to the field of brake or clutch structures and specifically to a friction unit assembly incorporating pivotally interconnected shoe sections adapted to receive friction material. The assembly of shoe sections is movable as a unit into an engagement with a drum surface upon operating force being applied to the assembly.

2. Description of the Prior Art

In brake or clutch structures, it is desirable to have uniform engagement and pressure between the engaging surfaces with respect to the brake lining material and the brake or clutch drum. Fast but graduated application of the actuating force applied to the brake or clutch shoe is the ideal to result in uniform engagement at all points on the brake lining material so that maximum brake or clutch frictional drag with the drum occurs uniformly over the entire area of the lining material. By achieving such ideal lining engagement conditions, hot spots in the lining material caused by nonuniform lining engagement are avoided. Consequently cooler operation of the structure and increased life of both the lining material and drum are the result. By the same token, less brake or clutch force is required to perform the braking or clutching operation. Also vibration or chattering during lining material engagement with the drum is minimized. Indeed, nonuniform lining engagement can cause permanent deformation and warpage of the table and web of the conventional brake shoe requiring extensive reworking of the shoe or even requiring it to be scrapped.

With the conventional rigid arcuate brake shoe the pressure and engagement of the lining material with the drum are frequently nonuniform. Most usually the pressure is concentrated at the center or toward the so-called "dead end" or anchor end of the shoe when brake actuating force is applied. This follows from the fact that the fixed arc of the shoe, having a smaller radius of curvature than that of the drum which it is to engage, forms a lever which pivots about the anchor pin or dead end of the shoe. Thus as the lining material is urged into engagement with the drum the shoe may not adjust or compensate for lining wear. This nonuniform pressure engagement contributes to overheating of the brake structure, uneven lining wear, localized hot spots and even permanent deformation or other warpage of the brake shoe table and web. Also, the conventional rigid arcuate brake shoe is unable to adjust to drum distortion to a somewhat elliptical configuration occurring under application of braking forces. This distortion of the drum to an elliptical form from its original cylindrical shape contributes to the rigid arcuate shoe not mating with the distorted drum or localized hot spots and permanent deformation by inward buckling of the shoe to occur.

Prior art brake and clutch structures have sought to solve the above mentioned problems with a number of proposals for articulated and sectional brake shoe assemblies incorporating two or more sections pivotally interconnected in longitudinal alignment with each other. Many of these articulated friction unit assemblies incorporate a biasing means acting between adjacent arcuate sections to draw the sections into a minimum arc of curvature. With these approaches the actuating force applied to the assembly has the effect of opening the arcuate shoe sections outwardly to expand the assembly to a greater arc of curvature in engaging the shoe sections with the drum surface, this greater arc being limited solely by the diameter of the drum with which the shoe sections engage. The assembly cannot properly adjust to the distorted shape of the drum under actuating pressure so that in addition to hot spots and buckling effects, there can be a loss of braking effectiveness.

SUMMARY OF THE INVENTION

It is a principal object of the instant invention to provide a simple friction brake or clutch assembly which is efficient and most effectively provides uniform engagement of the brake lining material with the drum throughout the entire surface area of such material usable in performing a braking or clutching operation.

Another important object of this invention is to provide a sectionalized friction assembly incorporating at least two arcuate shoe sections which are pivotally interconnected in longitudinal alignment wherein the maximum arc to which the sections may pivotally move relative to each other is positively limited and biasing means urges the shoe sections to maintain this maximum arc while yieldably permitting the sections to pivot to a smaller arc relationship. This promotes the ability of the assembly to adjust to the elliptically deformed drum discussed above.

It is a further object of the invention to provide a friction unit assembly incorporating pivotally interconnected arcuate shoe sections employing a lever arm fixed to one section and extending past the pivotal connection to the other section where a stop means limits the outward pivoting of the sections relative to each other and a spring biases these sections to yieldably hold this maximum arc.

It is also an object of the invention to provide a friction unit assembly having arcuate shoe sections which are pivotally interconnected where the maximum outward pivoting of the sections is positively limited to prevent inward buckling of the sections and lining material carried thereby away from the drum adjacent the juncture between the adjoining ends of the shoe sections.

The above mentioned objects, aims, and purposes of this invention are substantially met by a friction unit assembly having arcuate shoe sections pivotally interconnected in longitudinal end to end alignment where each shoe section has at least one web extending perpendicularly and radially inward of the arcuately curved plate which carries the friction material. A lever arm is secured to one section and extends past the pivotal interconnection to the adjacent section where it engages a member that limits the maximum arc to which the shoe sections may pivotally move relative to each other and biasing means engages this lever arm to urge the shoe sections to maintain this maximum arc.

BRIEF DESCRIPTION OF THE DRAWINGS

FIG. 3 is a sectional view taken on line 3—3 of FIG. 1.

FIG. 4 is an elevational view of a portion of another embodiment of the articulated friction unit assembly of this invention.

FIG. 5 is a sectional view with some parts in elevation taken on line 5—5 of FIG. 4.

DETAILED DESCRIPTION OF THE INVENTION EMBODIMENTS

Figure 1:
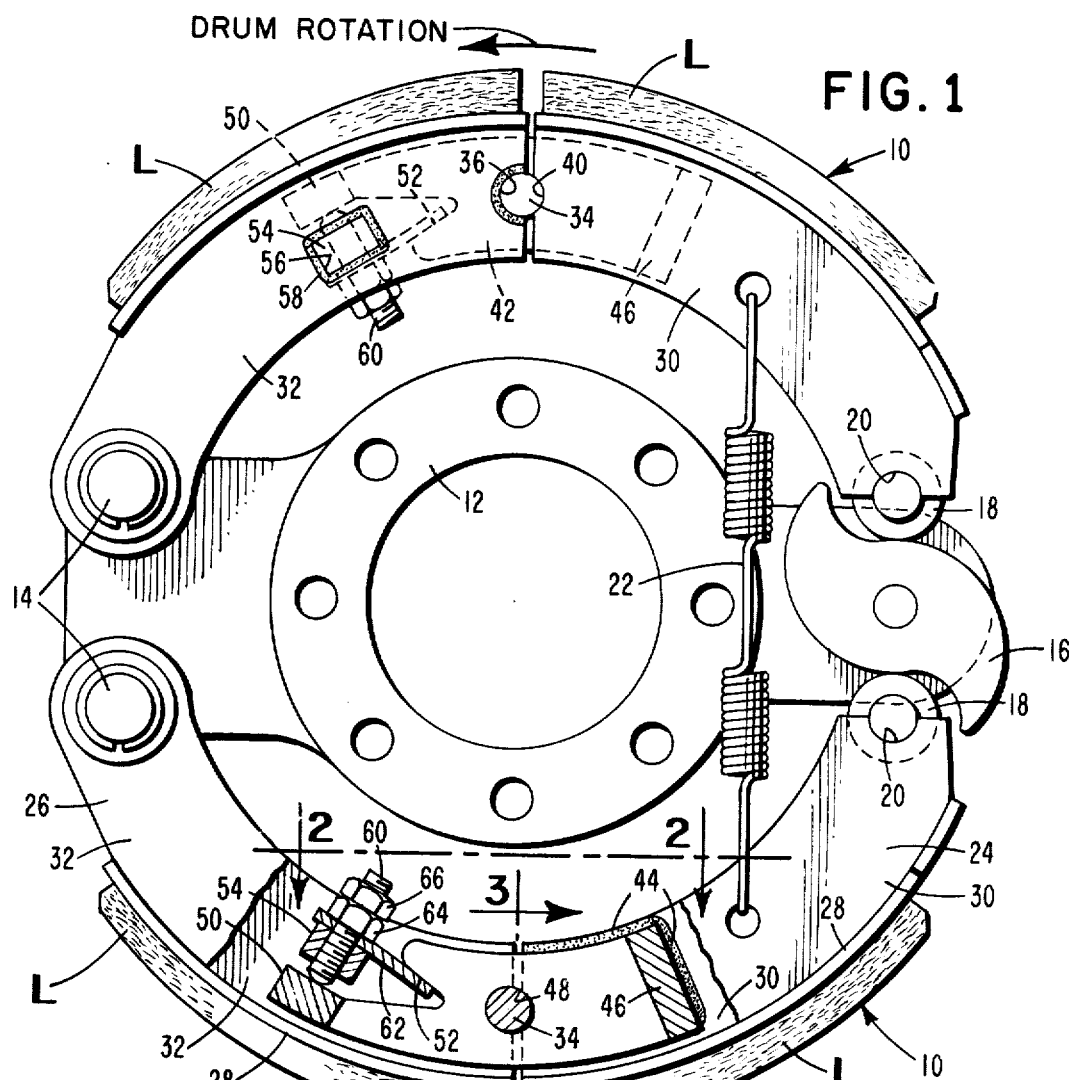
FIG. 1 is an elevational view, partially in section, showing two friction unit assemblies of the instant invention mounted in operable relationship to a supporting backing plate which carries the anchor pins and S cam actuator.
Figure 2:
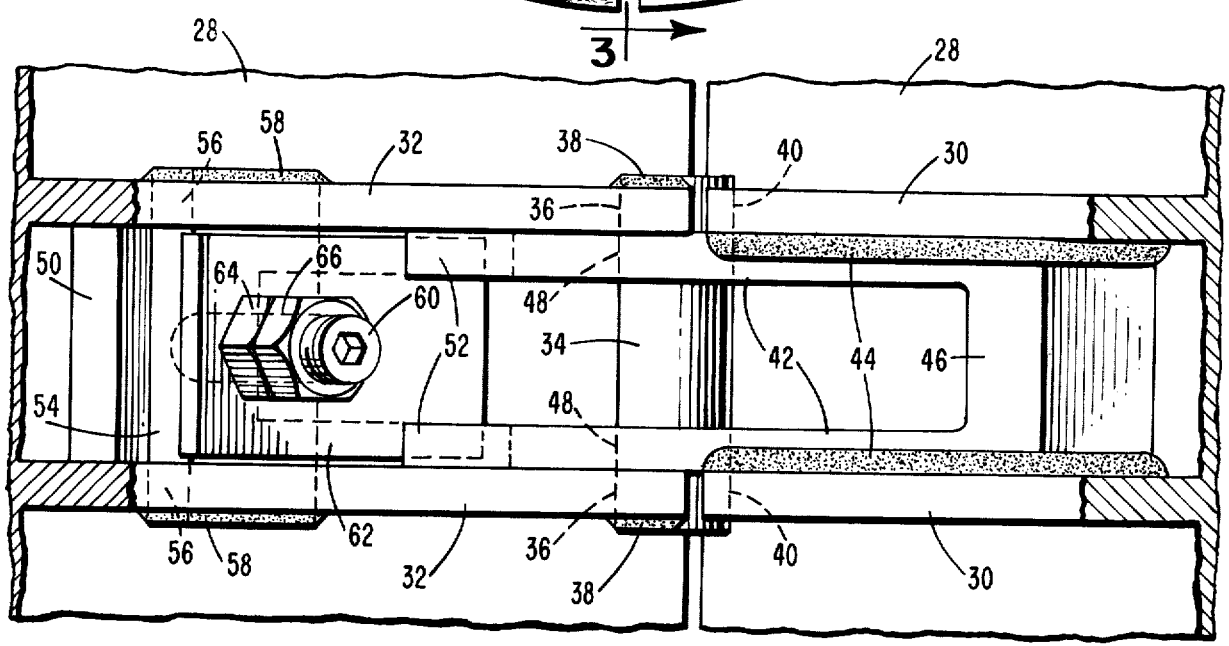
FIG. 2 is a sectional view taken on line 2—2 of FIG. 1.
Figure 6:
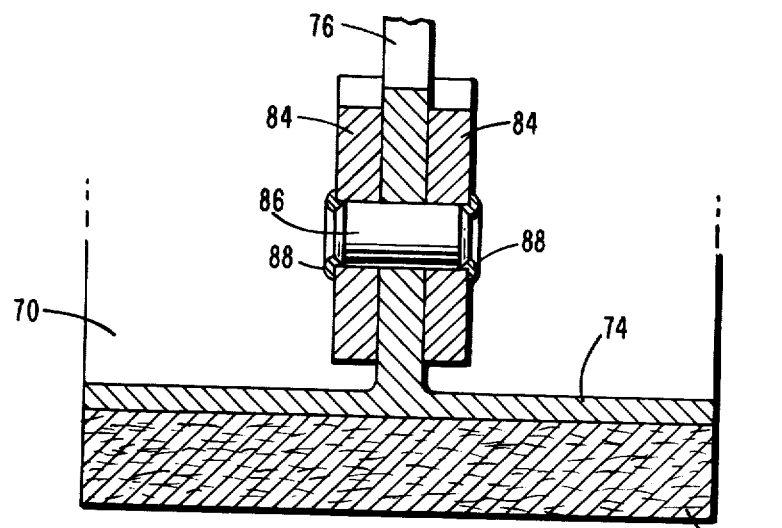
FIG. 6 is a sectional view taken on line 6—6 of FIG. 4.
Figure 7:
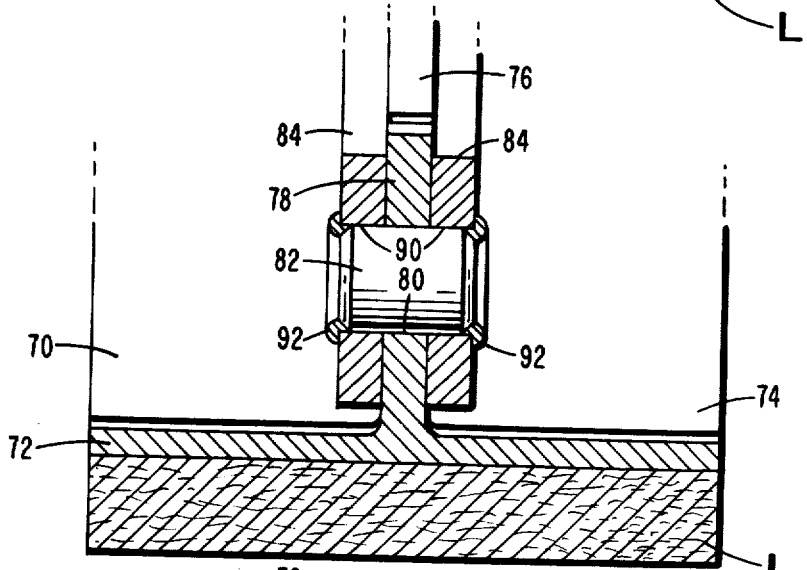
FIG. 7 is a sectional view taken on line 7—7 of FIG. 4.

Two preferred embodiments of the invention are disclosed. FIGS. 1, 2, and 3 show the invention applied to a friction unit assembly wherein each arcuate shoe section has a pair of parallel webs extending perpendicularly to and radially inward of the arcuately curved plate which provides the face on which the lining material is secured. FIGS. 4–8 illustrate another embodiment having only a single inwardly extending web on each arcuate shoe section.

Referring to FIG. 1, where the invention is illustrated mounted in its operating environment, a pair of friction unit assemblies 10 are shown mounted on a conventional backing plate 12 which is, as well known in the art, securely bolted to a base component, such as an axial housing in a vehicle brake application. Backing plate 12 supports the usual anchor pins 14 on which the anchor sections of the friction unit assemblies are mounted. A conventional brake actuator in the form of an S cam 16 is shown supported on backing plate 12 to be rotated about its axis by any well known form of operating mechanism (not shown). S cam rotation actuates the two assemblies to move them into engagement with the drum surface. Also as is conventional in S cam brake actuators, rollers 18 ride on the surface of the S cam 16. These rollers have stub shafts which are received in semi-circular notches 20 formed in the ends of the friction unit assemblies to which the actuating force is applied. Finally, as also is conventional in brake or clutch structures, a return spring 22 is provided connected between holes in the webs of the assemblies to supply a biasing force which urges the friction unit assemblies toward each other, away from the drum and into continual engagement with the surface of the S cam 16 through rollers 18.

Since the two friction unit assemblies shown in their mounted relationship are identical in construction, description of only one such assembly will be given herein.

The friction unit assembly is made up of an actuating cam section 24 having the notches 20 in its end to engage with roller 18 and an anchor section 26 pivotally connected to the cam section 24 as described hereinafter. The anchor section 26 is secured to pivot about one of the anchor pins 14 carried on backing plate 12. Each of the shoe sections 24 and 26 has an arcuate plate 28 providing an outer arcuately curved face to which lining material L is secured by conventional lining securing means. In the embodiment shown in FIGS. 1, 2, and 3 there are spaced parallel webs 30 on shoe section 24 and corresponding webs 32 on shoe section 26.

The pivotal interconnection between shoe sections 24 and 26 is provided by a levering pin 34 which is secured, as by welding 38, in semicircular notches 36 formed in the ends of the webs 32 of shoe section 26. The opposite half of levering pin 34 is received in semicircular notches 40 formed in the abutting ends of webs 30 so that shoe section 24 may pivot on the outer surface of pin 34 in carrying out a braking or clutching operation.

Each web 30 of shoe section 24 has a lever arm 42 welded at 44 thereto, the lever arm assembly being completed by a bridge element 46 extending between the webs 30 and the lever arms 42 also welded to the webs 30 by weldment 44. Each of the lever arms 42 has a bore 48 through which the lever pin 34 passes so that in the assembled condition the pin 34 is trapped. The shoe sections 24 and 26 are thus firmly held in pivotal engagement relative to pin 34 by this pin passing through bores 48 in the lever arms 42. The lever arms extend past the pivotal connection provided by pin 34 to lie adjacent the inner faces of the parallel webs 32 on shoe section 26. An abutment stop 50 is secured between the ends of the lever arms 42. Inwardly of this abutment stop each lever arm has a spring rest ledge 52 formed therein.

An arc diameter limiting member 54 in the form of a rectangular rod is mounted in the parallel webs 32 of shoe section 26. This rod passes through two rectangular openings 56 in the respective webs 32 and is welded at 58 to the outer surfaces of webs 32. The member 54 has a threaded bore which receives a screw 60 that is preferably provided with an Allen wrench receiving socket in its outer end, as shown in FIG. 2, to facilitate adjustment of this screw relative to the arc diameter limiting member 54.

It will be readily recognized from FIG. 1 that by threading screw 60 into or out of the threaded bore in member 54, the position of the lower end of screw 60 will be altered. The end of screw 60 engages the abutment stop 50 on the ends of lever arms 42 and thus by the adjustment of the position of screw 60 relative to member 54 the maximum arc to which the shoe sections 24 and 26 may move pivotally about pin 34 relative to each other is determined. It is this abutment stop engaging with the end of screw 60 on member 54 that determines the fixed maximum arc for the friction unit assembly and acts as a positive stop against the assembly buckling inwardly adjacent the pivotal interconnection between shoe sections 24 and 26. Such buckling could result in lower application of lining material pressure against the drum at this juncture point.

A flat spring 62 is also positioned on the rectangular member 54, the spring having a hole therethrough to be received over the adjusting screw 60. The spring 62 extends from member 54 down beneath the spring rest ledges 52 formed in the lever arms 42. A nut 64 is threaded onto screw 60 and tightened down against flat spring 62 to fasten it securely against the surface of member 54, and in so doing tension the spring so that it applies the desired biasing force on spring rest ledges 52 of the lever arms 42. By this relationship it will be appreciated that the flexed and stressed flat spring 62 applies a biasing force against the lever arms 42 which are secured to the other shoe section 24 so as to yieldably urge the sections 24 and 26 to their maximum arc relationship. As previously noted, this maximum arc is limited by the end of screw 60 acting against abutment stop 50. It also will be appreciated that within the limit of the drum diameter with which the friction unit assembly is to cooperate, by extending screw 60 further from member 54 to engage abutment stop 50 the arc diameter will not only be increased but also the flat spring 62 will be further tensioned or flexed, thereby increasing the resistance to yielding of the shoe sections 24 and 26 to pivot into a smaller arc diameter.

Once the friction unit assembly has been properly adjusted in relation to the drum diameter with which it is to be used, a lock nut 66 is threaded onto screw 60 and jammed against the nut 64 already on the screw so as to firmly secure the screw and spring 62 in the desired adjusted position.

An alternative single web friction unit assembly embodiment is illustrated in FIGS. 4-8. In this embodiment a shoe section 70 is pivotally connected to a shoe section 72. As in the previous embodiment shoe section 70 will preferably be the actuating cam section while section 72 will be the anchor section of the assembly. Each section has an arcuate plate 74 which provides the arcuately curved face on which the conventional friction lining material L is suitably fastened.

Shoe section 70 has a single central web 76 extending perpendicularly to and radially of the arcuately curved plate 74 carrying the lining material. Likewise shoe section 72 has a radially inwardly extending web 78. Adjacent the interconnected ends of shoe sections 70 and 72 a circular opening 80 is provided in web 78. A levering pin 82 is received through this opening to form the pivoting member for interconnecting the shoe sections 70 and 72 as will be described.

A pair of lever arms 84 are fastened to the opposite faces of web 76 by means of a pair of spaced pins 86 passing through the lever arms and web 76. Pins 86 are welded at 88 on the outer faces of the two lever arms 84. The levering pin 82 disposed in opening 80 of web 78 is received in holes 90 in the lever arms 84 and the pin is then welded at 92 to the outer faces of the lever arms 84. This secures the pin relative to these arms leaving it free with respect to the opening 80 in web 78 for the shoe sections to pivot relative to each other about the axis of pin 82.

Figure 8:
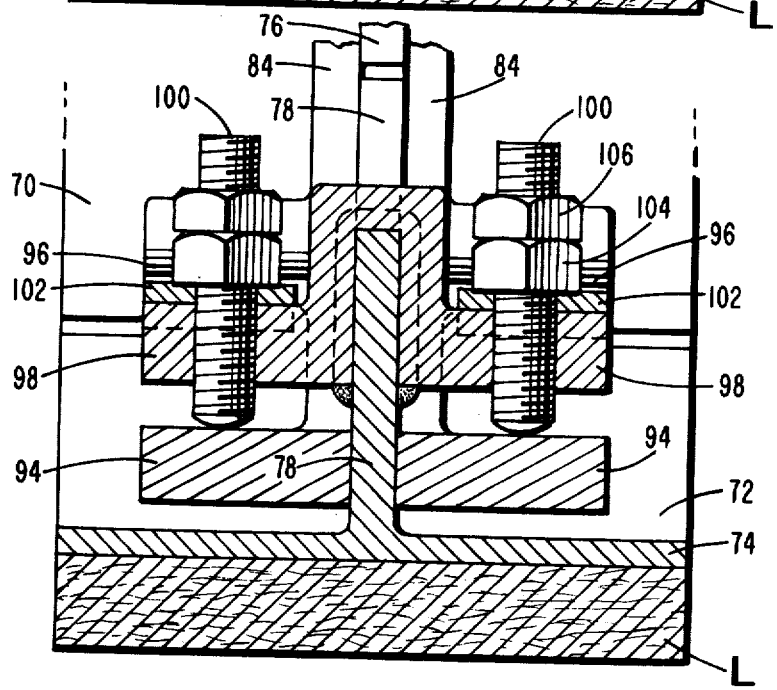
FIG. 8 is a sectional view taken on line 8—8 of FIG. 4.

The unsecured end of each lever arm 84 has an abutment stop 94 formed thereon. Adjacent the abutment stop there is also formed a spring rest ledge 96 on each lever arm 84. An arc diameter limiting member 98 is secured to the web 78 of shoe section 72 as by welding. This member provides outwardly extending wings as shown in FIGS. 5, and 8, each of which is provided with a threaded bore to receive an adjusting screw 100. As in the previous embodiment, each adjusting screw may best be provided with an Allen wrench receiving socket in its outer end. By use of an Allen wrench, the screws 100 may be adjusted in or out of the bore in member 98 so that the ends of the screws 100 provide a limit stop for engagement by the abutment stop 94 on each lever arm 84. As in the previous embodiment, the outermost limit or maximum arc for pivoting of the sections 70 and 72 relative to each other is fixed by the point of adjustment of the ends of the screws 100 in engagement with abutment stops 94. A flat spring 102 is provided with an opening to be able to pass over adjusting screw 100, one spring for each screw 100. The free ends of these springs extend beneath the spring rest ledges 96. Nuts 104 are threaded onto screws 100 and tightened down to clamp springs 102 against the surface of member 98. In so doing springs 102 are flexed and thereby stressed to apply force against spring rest ledges 96, thereby yieldably urging the shoe sections 70 and 72 to remain in a maximum arc condition by the force of springs 102 being applied to ledges 96 and thence through the lever arms 84 to shoe section 70.

Locking nuts 106 are threaded onto the adjusting screws 100 and jammed against the already present nuts 104 once the position of screw 100 has been properly adjusted to achieve the maximum desire arc limit for the two shoe sections in relation to the drum diameter with which the friction unit assembly is to be used. As in the previously described embodiment it will of course be appreciated that if adjusting screws 100 are set for the arc limit to be at a greater arc, this will increase the flexing and tension of flat springs 102 to create a greater biasing force against the two shoe sections pivoting to a smaller arc diameter.

It is believed that when the S cam actuates the shoes into drum engagement the forces produced are inherently, though unintentionally, uneven. Drum distortion under braking forces can reshape the drum to a somewhat elliptical shape from its original cylindrical configuration. With the instant invention, the maximum arc limit for the sections prevents buckling of the sectionalized assembly inwardly adjacent the pivotal interconnection between the shoe sections. Still the pivotal connection enables the shoe sections to articulate to a lesser arc and thereby continue to engage the drum even in its elliptically distorted condition. Thus the maximum arc limitation serves to prevent inward buckling at the pivot joint while the pivotal interconnection between the shoe sections permits a smaller arc to be achieved to continue effective brake lining engagement with a drum that may be distorted under braking forces.

Although the invention has been illustrated and described primarily with respect to a two section embodiment, it will be appreciated that the invention is readily applicable to assemblies incorporating more than two arcuate shoe sections. Further, it is to be understood that the construction, form and embodiments of the invention herein generally described are to be taken only as preferred representations of the invention and that various changes and modifications in the arrangement of the components, parts, units, elements, etc. may be resorted to without departing from the disclosure of the invention of the scope of the appended claims.

I claim:

1. In a brake or clutch structure, a friction unit assembly adapted to be selectively engaged with a drum comprising:

first and second arcuate shoe sections pivotally interconnected in longitudinal end to end alignment and movable as a unit into engagement with a drum surface upon an operating force being applied to said assembly, each of said shoe sections having an arcuately curved face thereof adapted to receive friction material;

lever arm means secured to said first shoe section and extending past the adjoining ends of said shoe sections to said second shoe section with an abutment stop adjacent said second shoe section;

arc diameter limiting means carried by said second shoe section disposed generally radially inwardly of said abutment stop and engageable with said abutment stop to limit the maximum arc to which said shoe sections may pivotally move relative to each other, said second shoe section further having biasing means engaging said lever arm means in a direction to urge said shoe sections to said maximum arc while enabling said shoe sections to conform closely to a lesser arc that the drum distorts to under forces produced in braking.

2. In a brake or clutch structure, a friction unit assembly adapted to be selectively engaged with a drum comprising:

first and second arcuate shoe sections pivotally interconnected in longitudinal end to end alignment and movable as a unit into engagement with a drum surface upon an operating force being applied to said assembly, each of said shoe sections having an arcuately curved face thereof adapted to receive friction material;

at least one web on each shoe section extending perpendicularly to and radially inward of said arcuately curved face of the section;

lever arm means secured to the web on said first shoe section and extending past the adjoining ends of said shoe sections to lie adjacent the web of said second shoe section, said lever arm means having an abutment stop adjacent said second shoe section web;

an arc diameter limiting means secured to the web of said second shoe section generally radially inwardly of said abutment stop, said limiting means carrying adjusting means engageable with said abutment stop to limit the maximum arc to which said shoe sections may pivotally move relative to each other, the web of said second shoe section further mounting biasing means engaging said lever arm means to urge said shoe sections to said maximum arc.

3. In a brake or clutch structure, a friction unit assembly adapted to be selectively engaged with a drum comprising:

first and second arcuate shoe sections pivotally interconnected in longitudinal end to end alignment and movable as a unit into engagement with a drum surface upon an operating force being applied to said assembly, each of said shoe sections having an arcuately curved face thereof adapted to receive friction material;

at least one web on each shoe section extending perpendicularly to and radially inward of said arcuately curved face of the section;

lever arm means secured to the web on said first shoe section and extending across the adjoining ends of said shoe sections to lie adjacent the web of said second shoe section, said lever arm means having an abutment stop adjacent said second shoe section web;

an arc diameter limiting member on the web of said second shoe section generally radially inwardly of said abutment stop and engageable with said abutment stop to limit the maximum arc to which said shoe sections may pivotally move relative to each other; and biasing means on the web of said second shoe section engaging said lever arm means to urge said shoe sections to said maximum arc.

4. A friction unit assembly as recited in claim 3 wherein each shoe section has a pair of parallel webs and said lever arm means, arc diameter limiting member and biasing means are nested between said parallel webs.

5. A friction unit assembly as recited in claim 4 wherein the pivotal interconnection between said shoe sections comprises a levering pin received in generally semicircular notches in the abutting ends of the shoe sections at their juncture and said pin is captured to retain said sections pivotally interconnected by being engaged in bores in said lever arm means.

6. A friction unit assembly as recited in claim 4 wherein said lever arm means comprises lever arms secured to the inner faces of said parallel webs of said first shoe section to extend along the inner faces of the parallel webs of said second shoe section, and said abutment stop is connected between the ends of said lever arms.

7. A friction unit assembly as recited in claim 6 wherein said arc diameter limiting member extends between the inner faces of the parallel webs on said second shoe section, and an adjusting screw threadably engages said limiting member and said abutment stop to adjustably determine the maximum arc.

8. A friction unit assembly as recited in claim 3 wherein each shoe section has a single central web carrying said lever arm means, arc diameter limiting member and biasing means.

9. A friction unit assembly as recited in claim 8 wherein said lever arm means comprises lever arms secured to the outer faces of said single web of said first shoe section to extend along the outer faces of the single web of said second shoe section, and each of said lever arms carries an abutment stop.

10. A friction unit assembly as recited in claim 9 wherein said arc diameter limiting member extends laterally from the outer faces of said single web of said second shoe section, and each lateral extension of said member has an adjusting screw threadably engaged therewith to cooperate with the abutment stop on each lever arm in adjustably determining the maximum arc.

11. A friction unit assembly as recited in claim 3 wherein said arc diameter limiting member carries an adjusting screw which engages with said abutment stop to adjustably determine said maximum arc.

12. A friction unit assembly as recited in claim 3 wherein said lever arm means has a spring rest ledge adjacent said second shoe section web, and said biasing means comprises a flat spring biased to exert a generally radially inward force against said spring rest ledge.

13. A friction unit assembly as recited in claim 12 wherein said flat spring is secured to said arc diameter limiting member to impart the biasing force, and said limiting member carries an adjusting screw which engages with said abutment stop to adjustably determine said maximum arc.

14. A friction unit assembly as recited in claim 13 wherein said adjusting screw locates said flat spring on said arc diameter limiting member, and nut means cooperates with said screw to clamp said spring on said limiting member and fix said screw in its adjusted position for maximum arc determination.

* * * * *